(12) United States Patent
Suzuki et al.

(10) Patent No.: US 8,720,627 B2
(45) Date of Patent: May 13, 2014

(54) BATTERY ARRANGEMENT STRUCTURE OF VEHICLE

(75) Inventors: Seigo Suzuki, Hiroshima (JP); Akira Sone, Hiroshima (JP); Masayoshi Takahashi, Hiroshima (JP); Manabu Hashimoto, Hiroshima (JP); Masanoba Fukushima, Hiroshima (JP); Hiromasa Honji, Aichi (JP); Hiroto Kido, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 209 days.

(21) Appl. No.: 13/313,798

(22) Filed: Dec. 7, 2011

(65) Prior Publication Data

US 2012/0312613 A1 Dec. 13, 2012

(30) Foreign Application Priority Data

| Dec. 20, 2010 | (JP) | 2010-283311 |
| Mar. 17, 2011 | (JP) | 2011-059780 |
| Nov. 15, 2011 | (JP) | 2011-249863 |

(51) Int. Cl.
*B60R 16/04* (2006.01)
(52) U.S. Cl.
USPC ...................................... 180/68.5
(58) Field of Classification Search
USPC .......................................... 180/68.5
See application file for complete search history.

(56) References Cited

U.S. PATENT DOCUMENTS

| 5,086,860 | A * | 2/1992 | Francis et al. ............... 180/68.5 |
| 5,547,036 | A * | 8/1996 | Gawaskar et al. ........... 180/68.5 |
| 6,290,013 | B1 * | 9/2001 | Bienenstein, Jr. ........... 180/68.5 |
| 6,371,229 | B1 * | 4/2002 | Kakiuchi ................... 180/65.25 |
| 6,668,957 | B2 * | 12/2003 | King ........................... 180/68.5 |
| 6,827,168 | B2 * | 12/2004 | Miyazaki .................... 180/68.5 |
| 7,185,724 | B2 * | 3/2007 | Dupuis et al. ............... 180/68.5 |
| 8,122,989 | B2 * | 2/2012 | Burchett et al. ............ 180/68.5 |
| 8,123,253 | B2 * | 2/2012 | Tomizawa et al. ............ 280/851 |
| 8,336,657 | B2 * | 12/2012 | Dobbins et al. ............. 180/68.5 |
| 8,336,953 | B2 * | 12/2012 | Greb ........................ 296/193.04 |
| 8,474,559 | B2 * | 7/2013 | Sogabe ....................... 180/68.5 |
| 2005/0224268 | A1 * | 10/2005 | Dupuis et al. ............... 180/68.5 |
| 2006/0096794 | A1 * | 5/2006 | Yoshida ...................... 180/65.1 |
| 2009/0000841 | A1 * | 1/2009 | Reed et al. .................. 180/68.5 |
| 2009/0095550 | A1 * | 4/2009 | Batdorff ...................... 180/68.5 |
| 2011/0162902 | A1 * | 7/2011 | Dobbins et al. ............. 180/68.5 |
| 2012/0018237 | A1 * | 1/2012 | Kovach et al. .............. 180/68.5 |
| 2012/0312613 | A1 * | 12/2012 | Suzuki et al. ............... 180/68.5 |
| 2013/0056293 | A1 * | 3/2013 | Schurna et al. ............. 180/68.5 |

FOREIGN PATENT DOCUMENTS

| JP | 2006-089040 A | 4/2006 |
| JP | 2006-281806 A | 10/2006 |

* cited by examiner

*Primary Examiner* — Jeffrey J Restifo
(74) *Attorney, Agent, or Firm* — Studebaker & Brackett PC

(57) ABSTRACT

A battery is arranged at a specified position which is located on an outside of a front side frame in a vehicle width direction and between a front wheel and a crush can in a vehicle longitudinal direction. Accordingly, the battery can be positioned properly at a front portion of a vehicle so that the battery may not receive any improper thermal influence from an engine or a motor and not hurt the function of impact absorption in a vehicle frontal collision.

15 Claims, 12 Drawing Sheets

BATTERY ARRANGEMENT STRUCTURE OF VEHICLE

BACKGROUND OF THE INVENTION

The present invention relates to a battery arrangement structure of a vehicle which comprises a battery to charge electricity.

Conventionally, it is well known that a battery to charge electricity (Nickel metal hydride, Nickel-Cadmium rechargeable battery, Lithium-ion rechargeable battery, Lead-acid battery, for example), is installed to a vehicle, such as automotive vehicles. A capacitor is also known, besides the secondary cell, as such a battery (see Japanese Patent Laid-Open Publication No. 2006-89040, for example).

In many cases, the battery is arranged inside an engine room or a motor room (where a motor to drive an electromotive vehicle is provided) which is positioned at a front portion of the vehicle as disclosed in Japanese Patent Laid-Open Publication No. 2006-281806, for example, but there is also a case in which the battery is arranged below a floor of a vehicle compartment as disclosed in the above-described first patent document.

Herein, the battery (the capacitor, in particular) produces some heat, so it is preferable that the battery be cooled as much as possible by vehicle-traveling air. In the case of the battery arranged below the floor of the vehicle compartment, however, it may be difficult to let the vehicle-traveling air flow down toward the battery. Consequently, proper cooling of the battery may not be achieved efficiently.

Thus, it may be preferable that the battery be arranged at the front portion of the vehicle accordingly. However, in the case in which the battery is arranged inside the engine room or the motor room like the prior art descried above, the battery may receive easily an improper thermal influence from the engine provided in the engine room or the motor provided in the motor room. Accordingly, the battery may not be cooled efficiently in this case, either.

Further, in the case in which the battery is arranged at the front portion of the vehicle, it is needed that the battery does not hurt the function of impact absorption in a vehicle frontal collision.

SUMMARY OF THE INVENTION

The present invention has been devised in view of the above-described matters, and an object of the present invention is to arrange the battery at an appropriate position so that the battery may not receive any improper thermal influence from the engine or the motor and not hurt the function of impact absorption in the vehicle frontal collision in the case in which the battery is arranged at the front portion of the vehicle.

According to the present invention, there is provided a battery arrangement structure of a vehicle, comprising a pair of front side frames extending in a vehicle longitudinal direction at right-and-left sides of the vehicle, crush cans provided at respective front ends of the front side frames, and a battery to charge an electricity, wherein the battery is arranged at a specified position which is located on an outside of the front side frame in a vehicle width direction and in back of a front end portion of the crush can.

According to the present invention, since it is arranged on the outside of the front side frame in the vehicle width direction (i.e., on the outside of the engine room or the motor room), the battery may not receive any improper thermal influence from the engine or the motor. Accordingly, the battery can be cooled efficiently by the vehicle-traveling air. Further, since it is arranged in back of the front end portion of the crush can, the battery may not hurt the function of impact absorption of the crush can in the vehicle frontal collision (light collision), and also the battery can be prevented from being broken. Moreover, even if it retreats in a heavy collision in which the front side frame is crushed, the battery may not hurt the function of impact absorption of the front side frame with providing an appropriate distance between the battery and the front wheel, and the breakage of the battery can be restrained as much as possible.

According to an embodiment of the present invention, the battery is arranged such that its front end portion is located in back of a rear end portion of the crush can. Thereby, the crush can is allowed to crush sufficiently, preventing the breakage of the battery effectively in the vehicle frontal collision, so that the collision load can be absorbed efficiently.

According to an embodiment of the present invention, the battery is arranged such that its front end portion is located in front of the rear end portion of the crush can. Thereby, the crush can is allowed to crush sufficiently, preventing the breakage of the battery effectively in the vehicle frontal collision, so that the collision load can be absorbed efficiently, and also a sufficient distance between a rear end portion of the battery and a front wheel can be ensured.

According to an embodiment of the present invention, the battery is arranged such that its rear end portion is located in front of the front wheel. Thereby, any interference of the battery with the front wheel can be surely prevented.

According to another embodiment of the present invention, the above-described specified position of the battery arranged is offset, in the vehicle width direction, from one of the front wheels which is positioned closer to the battery in an elevational view of the vehicle. Thereby, even if it retreats in the heavy vehicle frontal collision (the front side frame is crushed), the battery may not interfere with the front wheel. Accordingly, the battery may not hurt the function of impact absorption of the front side frame, and the breakage of the battery can be restrained as much as possible. In particular, in a case in which the battery is supported at the front side frame, the battery retreats in accordance with the crush of the front side frame, so that interference of the battery with the front wheel would cause some improper influence to the function of impact absorption of the front side frame. However, since the battery is arranged to avoid any interference with the front wheel in this embodiment, the proper impact-absorption function of the front side frame can be ensured.

According to another embodiment of the present invention, the battery is supported at one of the front side frames which is positioned closer to the battery. Thereby, the battery is supported at the front side frames as a vehicle-body member having a high rigidity, so that the support rigidity of the battery can be increased.

According to another embodiment of the present invention, the battery is supported via a flange portion provided between the front side frame and the crush can. Thereby, the battery may not hurt the function of impact absorption function of the crush can and the front side frame in the vehicle frontal collision, and the breakage of the battery can be prevented.

According to another embodiment of the present invention, the flange portion extends below the front side frame, and the battery has a vertically-longer shape and is supported through an upper-side portion of the flange portion which is located above a level of a lower face of the front side frame and a lower-side portion of the flange portion which is located below the level of the lower face of the front side frame. In order to enlarge the battery volume as much as possible, it may be necessary to form the battery in a shape being longer in a vertical direction of the battery (i.e., the battery has a vertically-longer shape), considering the vehicle design (vehicle's overhang or width). Since the battery is supported through the upper-side portion and lower-side portion of the flange portion in this embodiment, the support rigidity of the battery can be further increased.

According to another embodiment of the present invention, the flange portion comprises a body portion and a support portion which extends forwardly from an outside end portion, in the vehicle width direction, of the body portion, and the battery is supported through the support portion of the flange portion. Thereby, since the support portion of the flange portion extends forwardly from the outside end portion of the body portion, it can be avoided that the crush can crushed in the vehicle longitudinal direction in the vehicle frontal collision interferes with the support portion, so that breakage of the support portion can be prevented.

According to another embodiment of the present invention, the crush cans are configured to crush in the vehicle longitudinal direction in a vehicle frontal collision, the support portion of the flange portion is arranged at a specified position which is located in back of a front end of the crush can crushed in the vehicle longitudinal direction in the vehicle frontal collision, and the battery is arranged at a specified position which is located in back of a rear end of the crush can. Thereby, since the support portion of the flange portion is arranged in back of the front end of the crush can crushed in the vehicle longitudinal direction in the vehicle frontal collision, any interference of the crushed can with the support portion can be avoided surely, so that the breakage of the support portion can be further prevented. Further, since the battery is arranged in back of the rear end of the crush can, the battery may not hurt the impact-absorption function of the crush can, and also the breakage of the support portion can be prevented.

According to another embodiment of the present invention, the flange portion comprises a temporary support portion to temporarily support the battery when the battery and the flange portion are fixed together. Thereby, since the battery is temporarily supported at the temporary support portion when the battery is fixed to the flange portion, the battery and the flange portion can be fixed together in a state of the battery being temporarily supported at the temporary support portion, so that assembling of the battery can be improved.

According to another embodiment of the present invention, a support bracket to support a fender panel provided above the front wheel is fixed to the front side frame, and the battery is supported via the support bracket. Thereby, there is no need of providing any particular member to support the battery, so that the weight increase and the cost increase of the vehicle can be prevented.

According to another embodiment of the present invention, the front side frames are configured to bend at plural portions thereof and crush in the vehicle longitudinal direction in a vehicle frontal collision, and the support bracket is fixed to another portion of the front side frame than the plural portions bending in the vehicle frontal collision. Herein, if the support bracket is fixed to the bending portions of the front side frame, the proper bending of the front side frame may be prevented by the support bracket, so that the impact-absorption function of the front side frame may be hurt. However, since the support bracket is fixed to another portion of the front side frame than the plural bending portions in this embodiment, the bending of the front side frame at the bending portions is not prevented by the support bracket, so that the proper impact-absorption function of the front side frame can be ensured.

According to another embodiment of the present invention, the support bracket is configured to maintain a fixing state thereof to the front side frame when the battery retreats in a vehicle frontal. Thereby, the retreat of the battery in accordance with the crush of the front side frame can be achieved surely.

According to another embodiment of the present invention, the battery includes plural battery elements which are arranged in two layers at an upper level and a lower level 1, and is covered with a cover member. Thereby, the battery elements can be arranged efficiently in the vertically-longer battery, so that the battery volume can be enlarged properly. Further, since the battery is covered with the cover member, it can be properly avoided that the battery receives any improper thermal influence from the engine or the motor or any damage from objects, water, or the like.

Other features, aspects, and advantages of the present invention will become apparent from the following description which refers to the accompanying drawings.

DETAILED DESCRIPTION OF THE INVENTION

Hereafter, a preferred embodiment of the present invention will be descried referring to the accompanying drawings.

Figure 1:
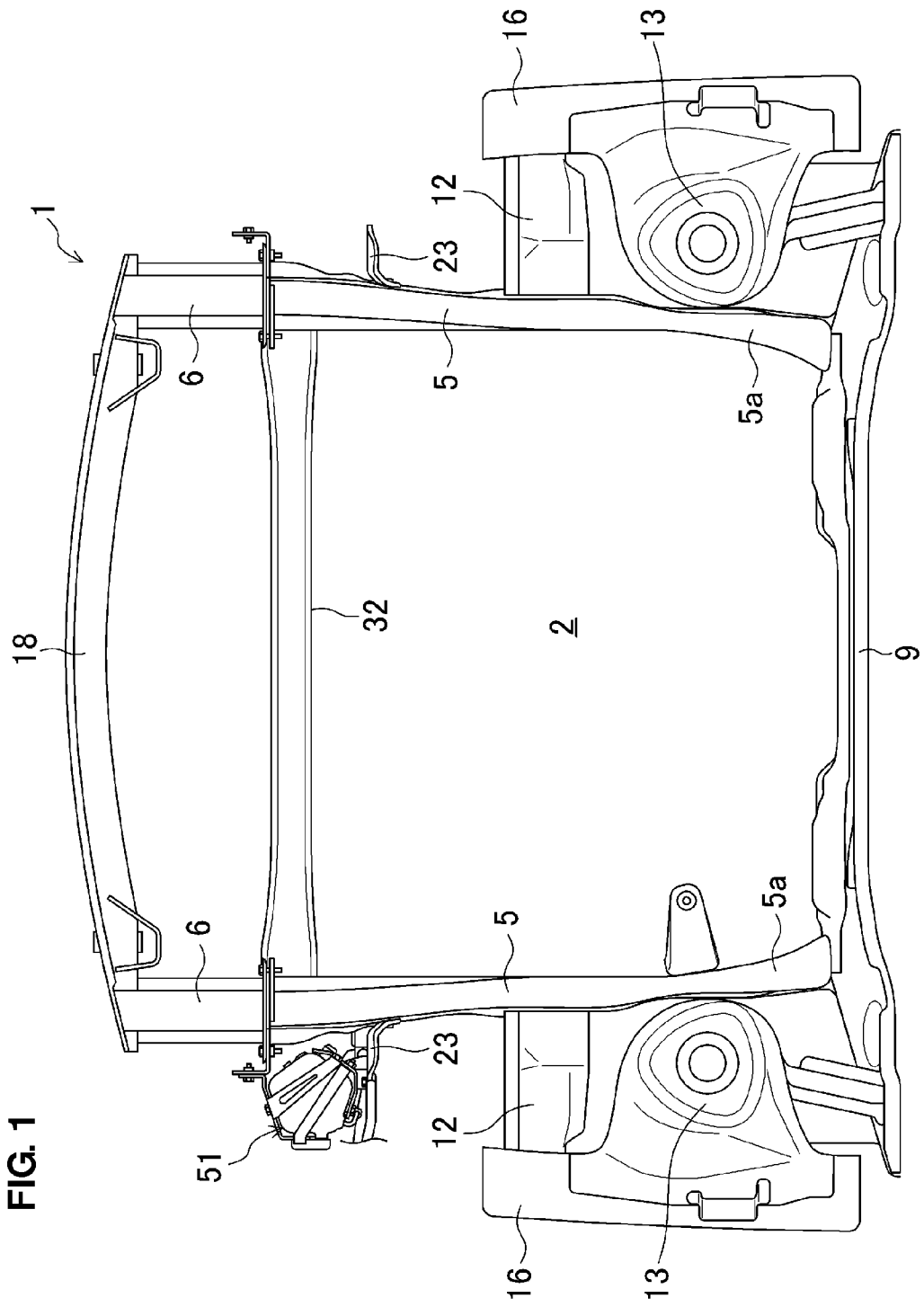
FIG. 1 is a plan view showing a major part of a front portion of a vehicle to which a battery arrangement structure according to an embodiment of the present invention is applied.
Figure 2:
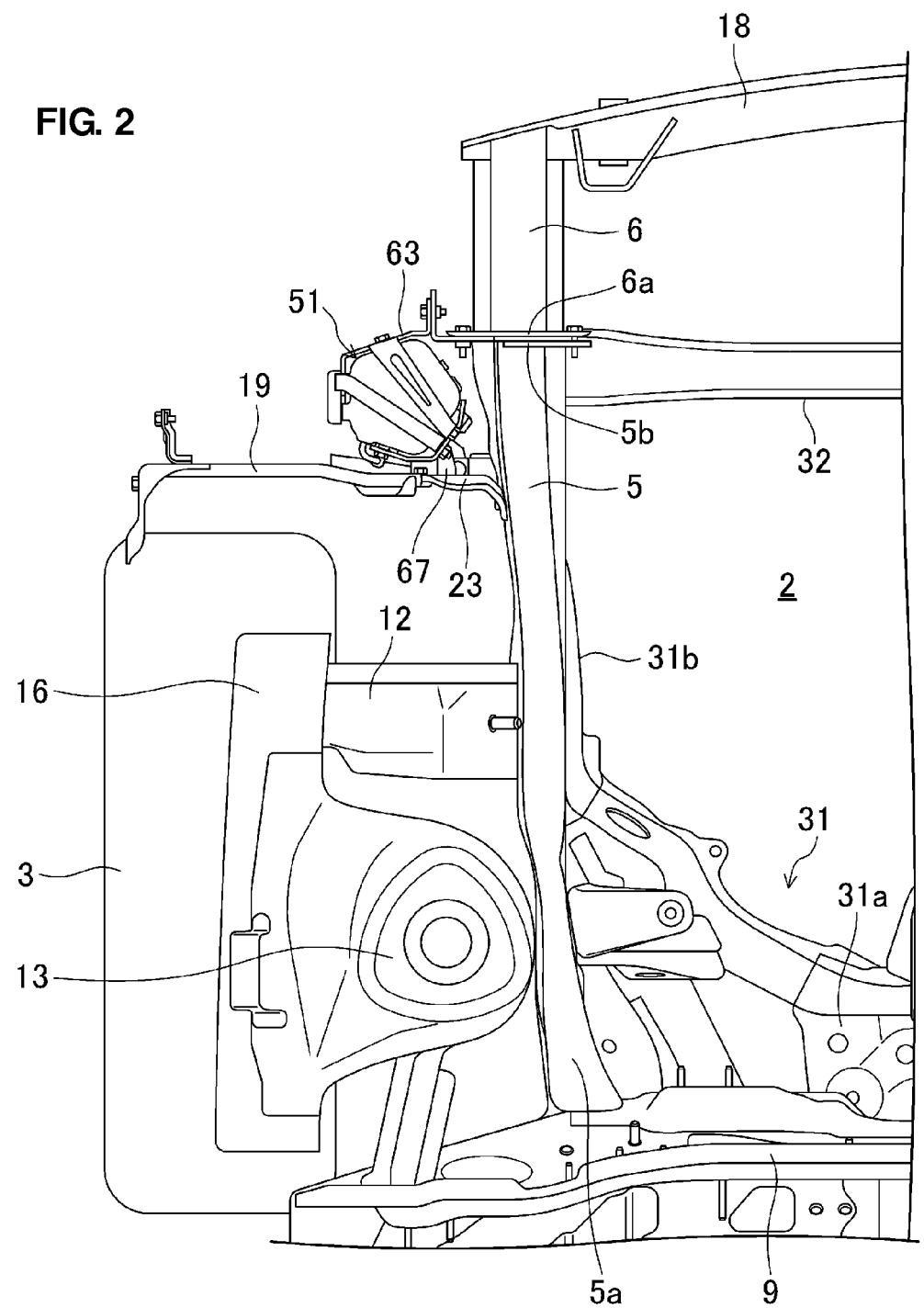
FIG. 2 is a plan view showing a left portion of the major part of the front portion of the vehicle.
Figure 3:
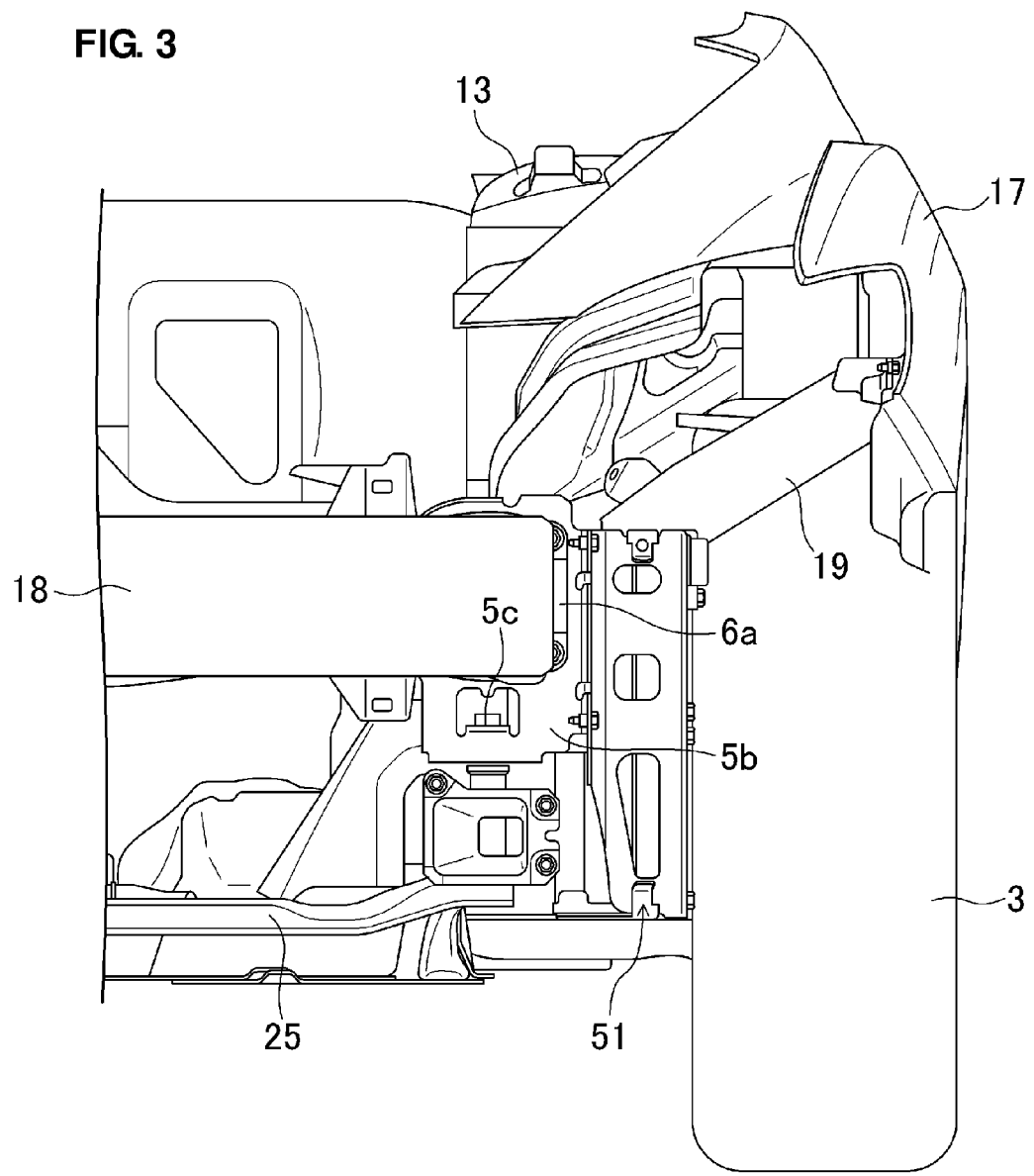
FIG. 3 is an elevational view showing the left portion of the major part of the front portion of the vehicle.

FIGS. 1 through 3 show a major part of a front portion of a vehicle 1 to which a battery arrangement structure according to the embodiment of the present invention is applied. An engine, not illustrated, is arranged inside an engine room 2 at the front portion of the vehicle 1, and drives right and left front wheels 3 of the vehicle 1. In FIGS. 1 through 3, illustration of the engine and other components which are installed inside the engine room 2 is omitted. Hereinafter, a front side, a rear side, a left side, an upper side and a lower side of relative to the vehicle 1 will be simply referred to as the front side, the rear side, the left side, the right side, the upper side and the lower side.

As shown in FIGS. 4 through 7, a pair of front side frames 5 is provided to extend in a vehicle longitudinal direction at both end portions, in a vehicle width direction, of the engine room 2. A rear portion of each of the front side frames 5 constitutes a kick portion 5a (see FIGS. 1 and 2), a level of which lowers gradually toward the rear side. A dash panel 9 is provided to partition the engine room 2 from a vehicle compartment at a specified position which corresponds to the kick portion 5a in the vehicle longitudinal direction.

To respective outside faces of the front side frames 5 are fixed right-and-left wheel house panels 12 to constitute wheel houses, and a pair of suspension towers 13 is provided on respective upper faces of the right-and-left wheel house panels 12. A pair of apron reinforcement members 16 extending longitudinally is fixed to respective upper end portions of the right-and-left wheel house panels 12, and respective upper end portions of the pair of suspension towers 13 are fixed to the pair of apron reinforcement members 16.

A fender panel 17 is provided above each of the front wheels 3 and the wheel house panels 12. To a front end portion of an outside face, in the vehicle width direction, of each of the front side frames 5 is welded a support bracket 23 to support the fender panel 17 via a stay 19. Each of the support brackets 23 extends outwardly from the outside face of the front side frame 5. This support bracket 23 is fixed to another portion than plural (three in the present embodiment) bending portions (bending points) 5d of the front side frame 5, which will be specifically described later. Concretely, the support bracket 23 is supported at a specified portion of the front side frame 5 which is positioned between the central bending portion 5d which bends inwardly in a heavy frontal-collision of the vehicle 1 and the rearmost bending portion 5d which bends outwardly in the heavy frontal-collision of the vehicle 1 and in the vicinity of a rear side of the central bending portion 5d. The support bracket 23 of the left-side front side frame 5 is configured to maintain its fixing state to the left-side front side frame 5 when the battery 51 retreats in the heavy vehicle-frontal collision as described later. Specifically, the thickness of the support bracket 23, the support rigidity of the support bracket 23 to the front side frame 5, and the like are configured so that the support state of the support bracket 23 at the front side frame 5 can be held. Respective inside end portions of the right-and-left says 19 are fixed to respective outside end portions of the right-and-left support brackets 23 via fastening members 24 (bolts and nuts (hereafter, the same)). Each stay 19 extends outwardly and upwardly from the support bracket 23, and its outside end portion is fixed to a front end portion of an outside end portion of the fender panel 17.

A front bumper, not illustrated, is provided at a front end portion of the vehicle 1, and a bumper beam 18 is provided inside this front bumper. This bumper beam 18 receives a collision load in the frontal collision of the vehicle 1.

Crush cans 6 are arranged at front ends of the right-and-left front side frames 5, respectively. Specifically, a flange portion 5b is formed at a front end of each of the front side frames 5, and a flange portion 6a is formed at a rear end of each of the crush cans 6. These flange portions 5b, 6a are overlapped and fixed together via fastening members 7. Herein, the longitudinal positions of the right-and-left crush cans 6 are the same. Further, the above-described members which are respectively provided on the right and left sides of the vehicle are basically configured to be located symmetrically relative to a center vertical face which passes longitudinally through the center of the vehicle 1 in the vehicle width direction and extends in a vehicle vertical direction.

Both-side end portions of the above-described bumper beam 18 are fixed to respective front ends of the right-and-left crush cans 6. When the bumper beam 18 receives the collision load during the vehicle frontal collision, the crush cans 6 crush longitudinally (having a plastic deformation) and thereby absorb an impact from the vehicle collision. Herein, in a case of a light collision, the impact absorption may be conducted through the crush of the crush cans 6 only (see FIG. 10). In a case of a heavy collision, however, the front side frames 5 bend inwardly and outwardly in zigzag at the three bending portions 5d and thereby crush longitudinally, so that the impact absorption may be conducted through the crushes of the front side frames 5 as well as the crush cans 6 (see FIG. 11). In FIG. 11, illustration of some of surrounding objects of the support brackets 23 is omitted just for easier understanding.

Between the both crush cans 6 behind the bumper beam 18 are arranged a frame-shaped shroud 20 to support a radiator, not illustrated. An upper member 21 which constitutes an upper-side portion of the shroud 20 extends outwardly and rearwardly, and both end portions of the upper member 21 are connected to respective front ends of the apron reinforcement members 16 via connection members 22. Thus, the shroud 20 is supported at the right-and-left apron reinforcement members 16.

A stiffener for pedestrian protection 25 which projects forwardly is fixed to a lower portion of the shroud 20. This stiffener 25 operates to sweep away leg portions of a pedestrian the front face of the vehicle 1 hits against in the frontal collision so that the pedestrian is carried onto the vehicle's engine hood or the like, thereby restraining any damage of the pedestrian's legs properly, such as fracture of a bone. Herein, a front side of the stiffener 25 is covered with a front bumper.

A suspension cross member 31 which extends in the vehicle width direction and supports the front wheels 3 at its both-side end portions is provided substantially at the same longitudinal position as the suspension tower 13 (see FIG. 2). The suspension cross member 31 comprises a body portion 31a which extends in the vehicle width direction and right-and-left forward extension portions 31b which extend forwardly from front ends of both-side end portions of the body portion 31a. Right-and-left front-wheel suspension arms (lower arms), not illustrated, are supported at the both-side end portions of the body portion 31a, respectively, thereby the front wheels 3 are supported at the suspension cross member 31 via the front-wheel suspension arms. Upward extension portions which extend upwardly are provided at both-side end portions of an upper face of the body portion 31a, and each of the upper end portions of the upward extension portions is fixed to a lower face of each of the front side frames 5.

The left-side forward extension portion 31b extends forwardly along the left-side front side frame 5 below the left-side front side frame 5. The right-side forward extension portion 31b extends forwardly along the right-side front side frame 5 below the right-side front side frame 5. The right-and-left forward extension portions 31b are located symmetrically relative to the center vertical face passing longitudinally through the center, in the vehicle width direction, of the vehicle 1.

Respective front end portions of lower faces of the forward extension portions 31b are interconnected by a connection cross member 32 which extends in the vehicle width direction. Thus, the body portion 31a and the forward extension portions 31b of the suspension cross member 31 and the connection cross member 32 constitute a perimeter frame which has a substantially rectangular frame shape in the plan view.

Figure 4:
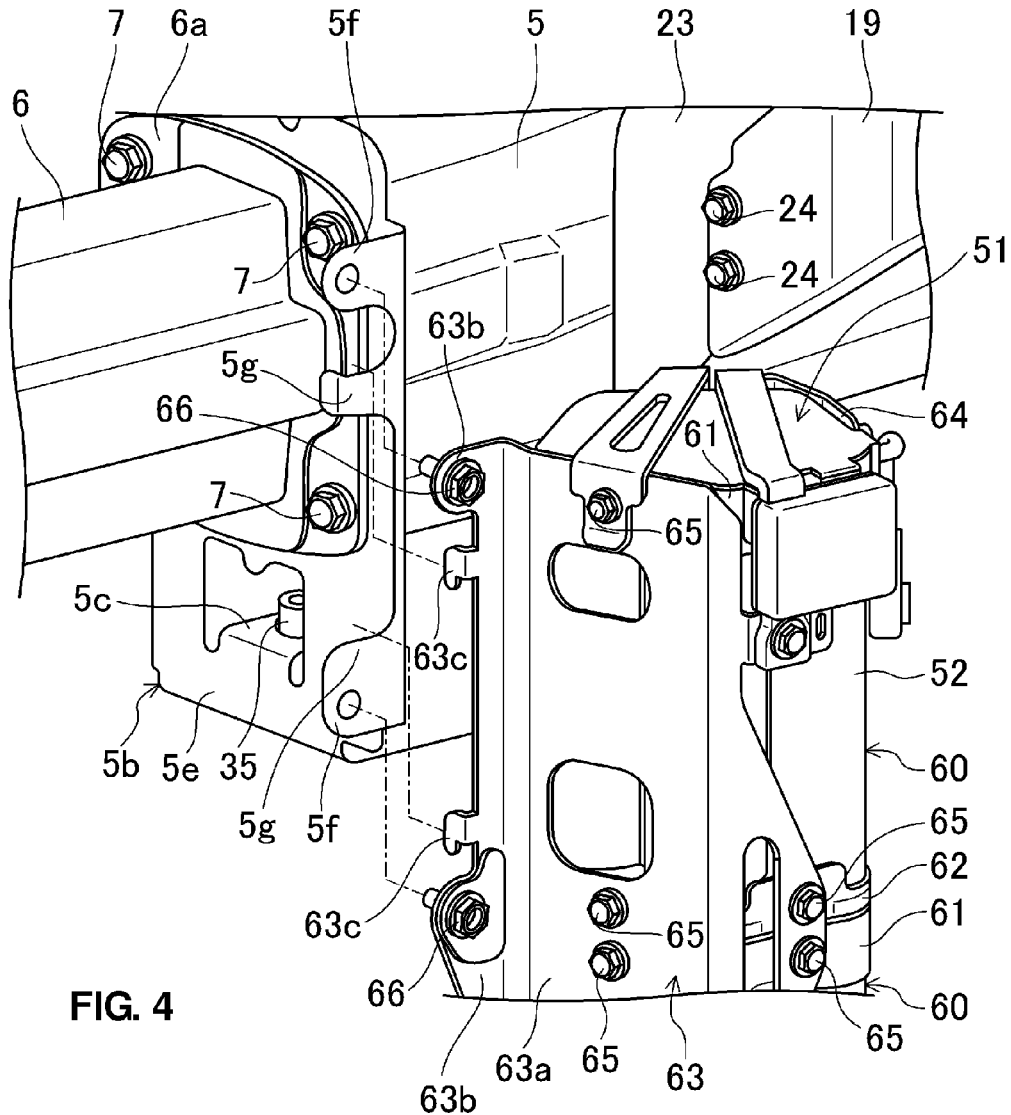
FIG. 4 is a perspective view showing around an attachment portion of a battery on the vehicle, when viewed obliquely from a left side and a front side of the vehicle.
Figure 5:
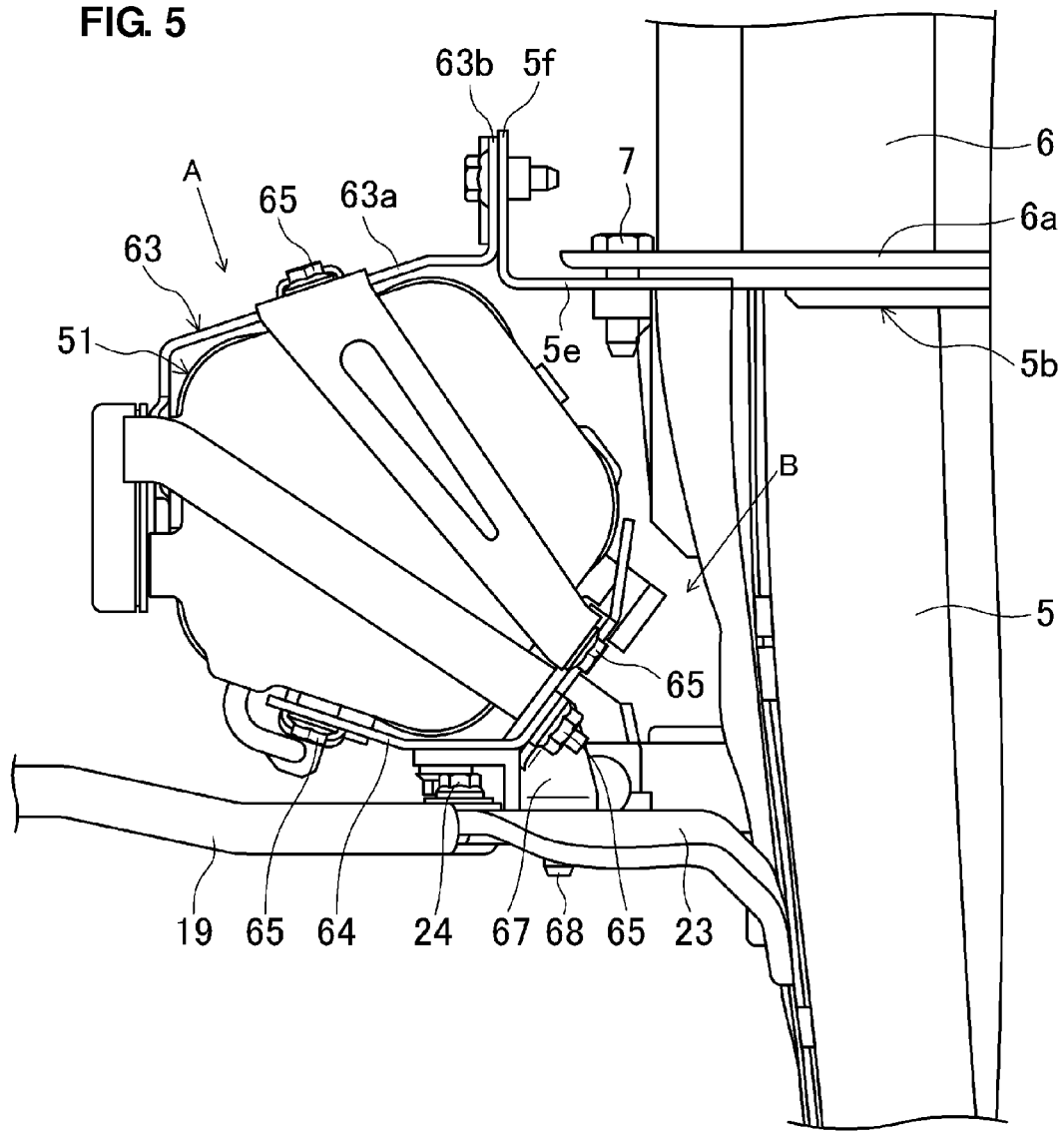
FIG. 5 is an enlarged plan view showing around the attachment portion of the battery in the vehicle.
Figure 6:
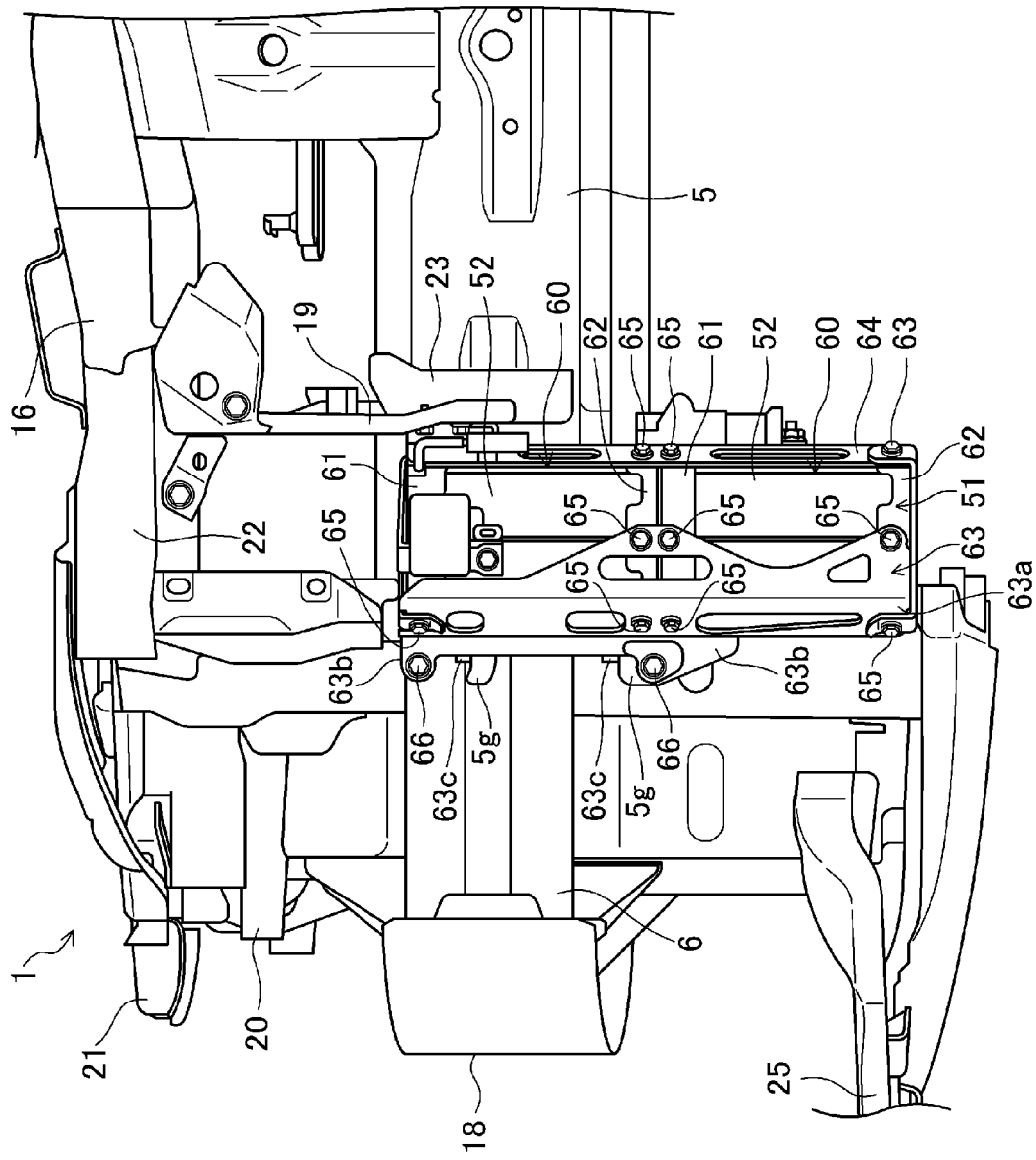
FIG. 6 is a side view showing around the attachment portion of the battery in the vehicle, when viewed from left.
Figure 7:
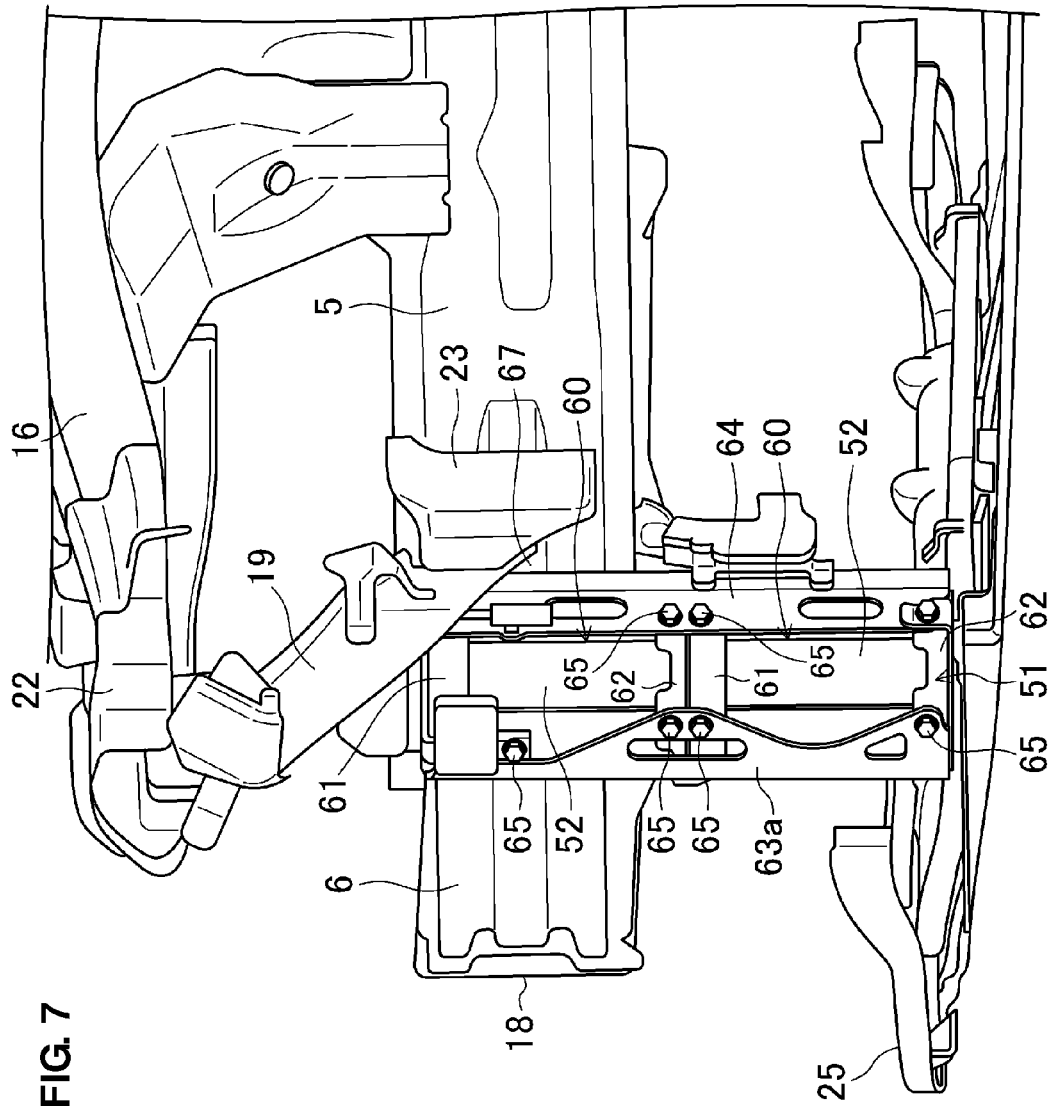
FIG. 7 is a perspective view showing around the attachment portion of the battery in the vehicle, when viewed obliquely from the left side and a rear side of the vehicle.

A cylindrical member 35 which extends upwardly is foxed to a front end portion of an upper face of each of the forward extension portions 31b, and an upper end of the cylindrical member 35 is fixed to a lower face of a fixing portion 5c which bends substantially horizontally at a lower portion of a body portion 5e, which will be described later, of the flange portion 5b of the front side frame 5 (see FIG. 4). Further, a connection member, not illustrated, which is connected to an end portion of the stiffener 25 is fixed to a front end of each of the forward extension portions 31b.

An under cover, not illustrated, which is formed integrally with the wheel house panel 12 is provided at a portion (a lower portion of a left-front corner portion of the vehicle 1) from a left end of the stiffener 25 to a front end of the left-side wheel house panel 12 and a portion (a lower portion of a right-front corner portion of the vehicle 1) from a right end of the stiffener 25 to a front end of the right-side wheel house panel 12.

Figure 8:
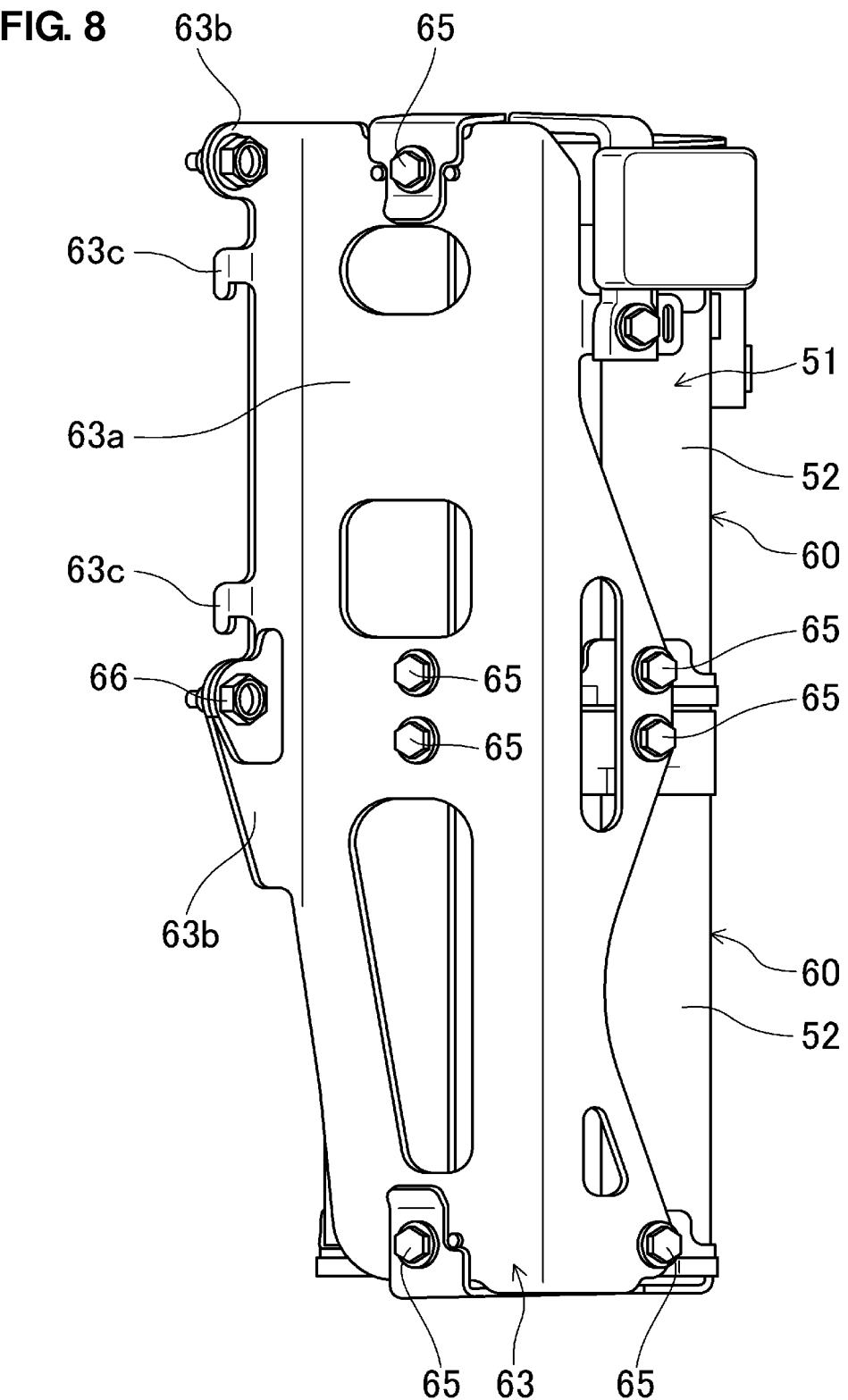
FIG. 8 is a perspective view showing the battery, when viewed in a direction of A of FIG. 5.
Figure 9:
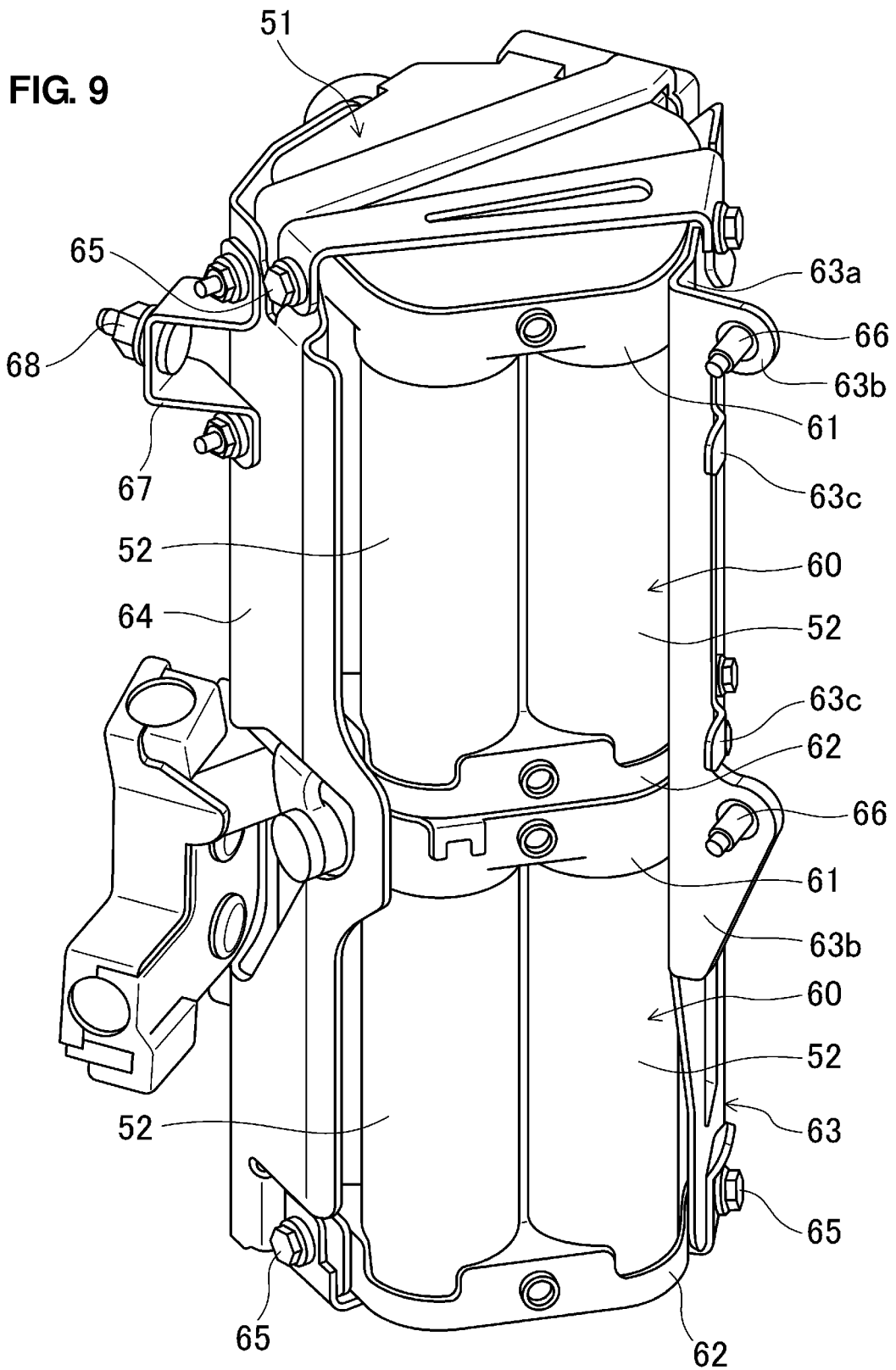
FIG. 9 is a perspective view showing the battery, when viewed in a direction of B of FIG. 5.

The battery 51 is arranged at a specified position (above the left-side under cover) which is located on the outside (left side) of the left-side front side frame 5 in the vehicle width direction, i.e., on the left and outside of the engine room 2, and between a front end of the front wheel 3 and a rear end of the crush can 6 in the vehicle longitudinal direction (see FIGS. 8 and 9). Specifically, the battery 51 is arranged in back of a front end portion of the crush can 6. More specifically, the battery 51 is arranged such that its front end portion is located in back of a rear end portion of the crush can 6 and its rear end portion is located in front of the wheel 3. Further, this battery 51 is arranged to be offset inwardly, in the vehicle width direction, from the left-side front wheel (which is positioned closer to the battery 51) in the elevational view of the vehicle (see FIGS. 2 and 3).

The above-described battery 51 (battery elements 52) charges the electricity generated by an alternator during a decoration of the vehicle 1, and the charged electricity (electric power) from the battery 51 is supplied to electric components installed to the vehicle 1 (air conditioner, audio device, navigation device, elimination device, for example). Further, the excessive electricity which has not been used by the above-described electric components is supplied to a lead-acid battery (provided inside the engine room 2) to supply the electricity (electric power) to the electric components. Herein, the battery voltage of the battery 51 is set at a specified voltage value higher than the voltage of the lead-acid battery, and then decreased by a DC/DC convertor when the electricity is supplied from the battery 51 to the above-described lead-acid battery or the above-described electric components.

As shown in FIGS. 8 and 9, the battery 51 includes plural battery elements 52 which are formed to extend vertically and have a circular section. In the present embodiment, the plural battery elements 52 are arranged in two layers at an upper level and a lower level, and the battery 51 is of a vertical-longer shape such that it extends to below the front portion of the left-side front side frame 5 (the front side frame 5 closer to the battery 51). That is, there are ten battery elements 52, in total, including the five elements at the upper level and the five elements at the lower level. These battery elements 52 are comprised of the capacitor. Further, all of the battery elements 52 are covered with a cover member (63, 64, which will be described below) made of metal which has a properly high rigidity and appropriate electric conductivity and heat transfer rate (aluminum, for example), and these are formed as a unit as described later. This cover member is of a vertical-longer shape.

The upper end portions of the five battery elements 52 at the upper and lower levels are inserted into an upper cap 61, and the lower end portions of those are inserted into a lower cap 62. Thus, these are formed as a unit, respectively (this is called a module 60). The both modules 60 are formed as a unit with metal-made front and rear plate-shaped members 63, 64. These plate-shaped members 63, 64 are fixed to the upper and lower caps 61, 62 of the modules 60 via fastening members 65.

The front end portion of the battery 51 is supported at the flange portion 5b of the left-side front side frame 5 (the flange portion 5b between the left-side front side frame 5 and the left-side crush can 6), and the rear end portion of the battery 51 is supported at the support bracket 23 of the left-side front side frame 5. Hereafter, the support structure will be described in detail.

The front-side plate-shaped member 63 comprises a body portion 63a which covers the front side of the battery 51, upper and lower attachment portions 63b which are of a hook shape and extend forwardly from a right end portion (an inward end portion) of the body portion 63a, and upper and lower hook portions 63c which are of a substantially L-shaped hook shape and extend inwardly from a rear end portion of the body portion 63a. The upper and lower attachment portions 63b are formed to bend forwardly at the right end portion of the body portion 63a, and the upper and lower hook portions 63c are formed to bend inwardly at the right end portion of the body portion 63a. The upper attachment portion 63b is arranged at the upper end portion (a portion above the lower face of the front portion of the left-side front side frame 5) of the right end portion of the body portion 63a, and the lower attachment portion 63b is arranged at a middle portion (a portion below the lower face of the front portion of the left-side front side frame 5) of the right end portion of the body portion 63a. The upper hook portion 63c is arranged in the vicinity of a lower side of the upper attachment portion 63b (near the upper end portion) at the right end portion of the body portion 63a, and the lower hook portion 63c is arranged in the vicinity of an upper side of the lower attachment portion 63b at the right end portion of the body portion 63a.

The flange portion 5b of the left-side front side frame 5 comprises a body portion 5e which is of a substantially-square shape, upper and lower support portions 5f which are of a hook shape and extend forwardly from a left end portion (an outward end portion) of the body portion 5e, and upper and lower temporary support portions 5g to temporarily support the battery 51 when the battery 51 is fixed to the flange portion 5b via fastening members 66. The body portion 5e extends downwardly to below the front portion of the left-side front side frame 5. The upper and lower support portions 5f and the upper and lower temporary support portions 5g formed to bend forwardly at the left end portion of the body portion 5e. The upper and lower support portions 5f are arranged in back of the front end of the crush can which is crushed longitudinally in the light frontal collision of the vehicle 1. The upper support portion 5f is arranged at an upper end portion (a portion above the lower face of the front portion of the left-side front side frame 5) of a left end portion of the body portion 5e so as to correspond to the upper attachment portion 63b, and is of a hook shape. The lower support portion 5f is arranged at a lower end portion (a portion below the lower face of the front portion of the left-side front side frame 5) of the left end portion of the body portion 5e so as to correspond to the lower attachment portion 63b. The upper temporary support portion 5g is arranged in the vicinity of a lower side of the upper support portion 5f (near the upper end portion) at the left end portion of the body portion 5e so as to correspond to the upper hook portion 63c, and is of a hook shape. The lower temporary support portion 5g is arranged right above the lower support portion 5f (near the lower end portion) at the left end portion of the body portion 5e so as to correspond to the lower hook portion 63c, and is formed integrally with the lower support portion 5f. The integrally-formed portion is of a hook shape.

The upper attachment portion 63b is fixed to the upper support portion 5f via the fastening member 66. The lower attachment portion 63b is fixed to the lower support portion 5f via the fastening member 66.

Herein, when it is fixed to the flange portion 5b of the left-side front side frame 5 via the fastening member 66, the battery 51 is temporarily supported at the flange portion 5b with the upper and lower temporary support portions 5g of the flange portion 5b being hooked by the upper and lower hook portions 63c of the front plate-shaped member 63. Accordingly, the battery 51 can be fixed to the flange portion 5b via the fastening members 66 in the temporary-support state of the battery 51 at the flange portion 5b, so that the assembling of the battery 51 is improved.

Further, the rear plate-shaped member 64 covers a rear side of the battery 51. To an inward end portion of the rear plate-shaped member 64 is fixed an attachment member 67 which extends rearwardly from a rear face of the rear plate-shaped member 64 and has a substantially U shape. A rear end portion (rear wall portion) of the attachment member 67 is fixed to a central portion of the support bracket 23 of the left-side front side frame 5 via a fastening member 68.

As described above, the battery 51 is attached to and supported at the flange portion 5b of the left-side front side frame 5 and the support bracket 23 via the front and rear plate-shaped members 63, 64 and the attachment member 67.

Since it is arranged on the outside of the left-side front side frame 5 (outside the engine room 2) as described above, the battery 51 may not receive any improper thermal influence from the engine. Thereby, the battery 51 can be efficiently cooled by the vehicle traveling wind. Further, since the battery 51 is supported at the flange portion 5b of the left-side front side frame 5, the function of impact absorption of the crush cans 6 and the front side frames 5 may not be hurt by the battery 51 and also the breakage of the battery can be prevented. Moreover, since the battery 51 is supported at the support bracket 23 which is fixed to the left-side front side frame 5 and supports the fender panel 17, it is unnecessary to provide any particular support member to support the battery additionally, so that the weight increase and the cost increase of the vehicle 1 can be prevented. Also, since the front end portion of the battery 51 is supported at the flange portion 5b of the left-side front side frame 5 (the flange portion 5b between the left-side front side frame 5 and the left-side crush can 6) and the rear end portion is supported at the support bracket 23 of the left-side front side frame 5, the support rigidity of the battery 51 can be further increased.

In a case in which the battery volume is enlarged as much as possible, it may be necessary to form the battery 51 in a shape being longer in the vertical direction as described above, considering the design of the vehicle 1 (vehicle's overhang or width). Since this vertically-longer battery 51 is supported through the upper-side portion (upper support portion 5f) and the lower-side portion (lower support portion 5f) of the flange portion 5b of the left-side front side frame 5, the support rigidity of the battery 51 can be further increased.

Figure 10:
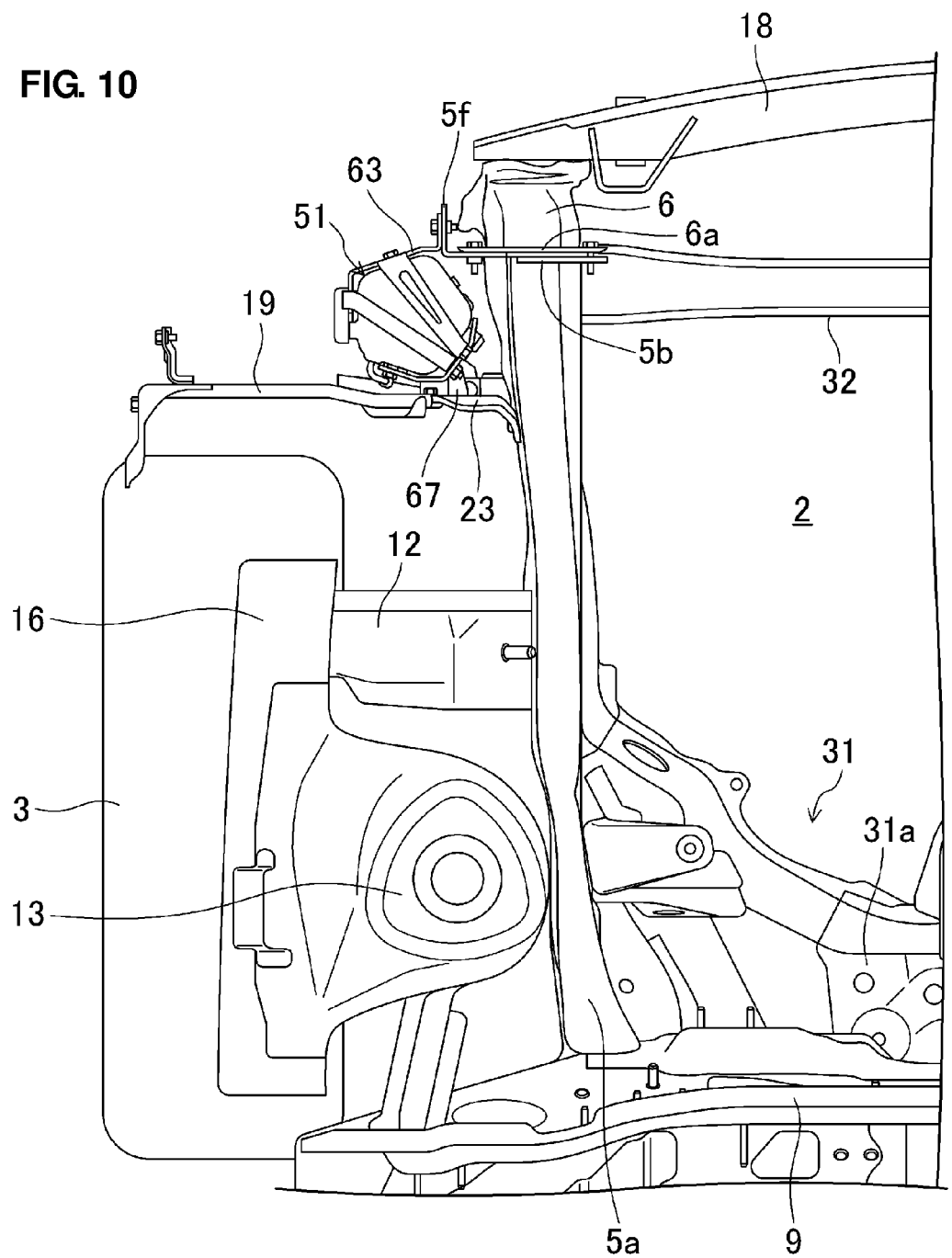
FIG. 10 is a plan view showing around the attachment portion of the battery in the vehicle in a light vehicle-frontal collision.
Figure 11:
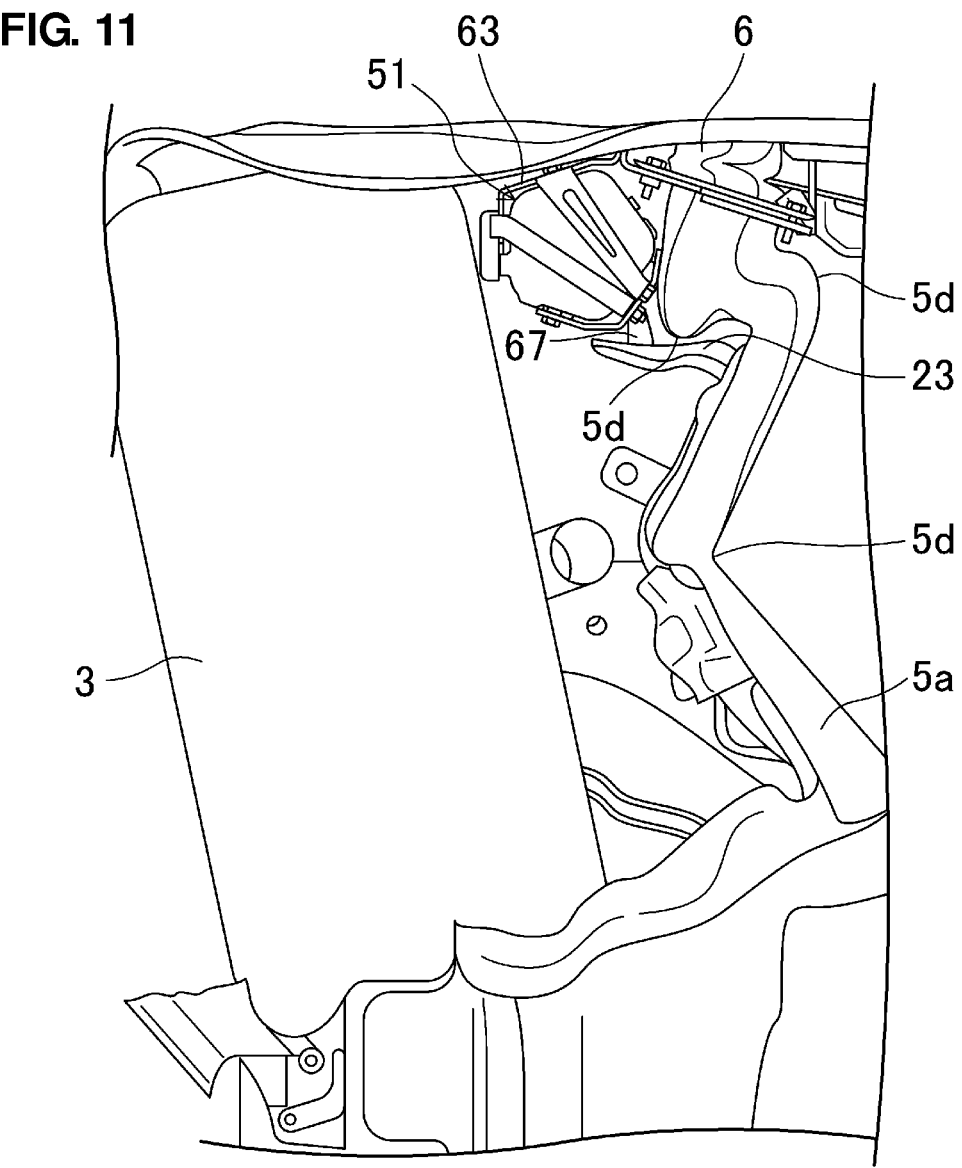
FIG. 11 is a schematic plan view showing around the attachment portion of the battery in the vehicle in a heavy vehicle-frontal collision.

In the case of the vehicle light collision in which only the crush cans 6 are crushed as shown in FIG. 10, the impact absorption is conducted through longitudinally crushing of the crush cans 6 which have received the collision load from the bumper beam 18. Herein, since it is arranged such that its front end portion is located in back of the rear end portion of the crush can 6, the battery 51 may not hurt the impact-absorption function of the crush can 6 and the breakage of the battery 51 can be prevented. Further, since the upper and lower support portions 5f of the flange portion 5b of the left-side front side frame 5 extend forwardly from the left end portion (the outward end portion) of the body portion 5e, the crush can 6 cursed longitudinally in the light frontal collision of the vehicle 1 may not interfere with the upper and lower support portions 5f, so that any breakage of the upper and lower support portions 5f can be prevented. Moreover, since the upper and lower support portions 5f of the flange portion 5b of the left-side front side frame 5 are arranged in back of the front end of the crush can 6 cursed longitudinally in the light frontal collision of the vehicle 1, any interference of the crushed crush can 6 with the upper and lower support portions 5f can be avoided surely, so that any breakage of the upper and lower support portions 5f can be further prevented.

In the case of the vehicle heavy collision in which both the crush cans 6 and the front side frames 5 are crushed as shown in FIG. 11, the impact absorption is conducted through longitudinally crushing of the right-and-left front side frames 5. Herein, if the support bracket 23 is fixed to the bending portion 5d of the front side frame 5, proper bending of the front side frame 5 at the bending portion 5d (bending deformation mode of the front side frame 5) may be prevented by the support bracket 23, so that the impact-absorption function of the front side frame 5 may be hurt improperly. In the present embodiment, however, the support bracket 23 is fixed to the other portion of the front side frame 5 than the bending portions 5d, bending of the front side frame 5 at the bending portions 5d may not be prevented by the support bracket 23, so that the proper impact-absorption function of the front side frame 5 can be ensured.

In a case in which the battery 51 is supported at the left-side front side frame 5 via the support bracket 23, the battery 51 retreats in accordance with the crush of the left-side front side frame in the heavy frontal collision of the vehicle 1, so that any interference of the battery 51 with the left-side front wheel 3 may cause the improper influence to the function of impact absorption of the front side frame 5. However, according to the present embodiment, the battery 51 is arranged at the position which is inwardly offset from the left-side front wheel in the elevational view of the vehicle 1 (between the left-side front wheel 3 and the left-side front side frame 5). Accordingly, the proper impact-absorption function of the front side frame 5 can be ensured, avoiding any interference of the battery 51 with the left-side front wheel 3. Moreover, since the support bracket 23 of the left-side front side frame 5 is configured to maintain its fixing state to the left-side front side frame 5 when the battery 51 retreats in the heavy frontal collision of the vehicle 1, the retreat of the battery 51 in accordance with the crush of the left-side front side frame 5 can be achieved surely.

The present invention should not be limited to the above-described embodiment, and any other modifications and improvements may be applied within the scope of a spirit of the present invention.

For example, while it is supported at the flange portion 5b of the left-side front side frame 5 and the support bracket 23 of the left-side front side frame 5 in the above-described embodiment, the battery 51 may be supported only at the flange portion 5b. Herein, in the case in which the battery 51 has the vertically-longer shape as described above in the present embodiment, it may be preferable that the battery 51 be supported both at the flange portion 5b and the support bracket 23 like the present embodiment.

Further, while it is supported at the flange portion 5b of the left-side front side frame 5, the battery 51 may be supported at the flange portion 6a of the left-side crush can 6.

While it is supported at the two positions of the flange portion 5b of the left-side front side frame 5, the battery 51 may be supported at one position or three or more positions of the flange portion 5b. Herein, in the case in which the battery 51 has the vertically-longer shape like the present embodiment, it is preferable that the battery 51 be supported at the upper portion of the flange portion 5b of the left-side front side frame 5 which is positioned above the lower face of the front portion of the front side frame 5 and the lower portion of the flange portion 5b of the left-side front side frame 5 which is positioned below the lower face of the front portion of the front side frame 5.

Moreover, the temporary support portion 5g may have another shape than the hook shape (a hole shape to be hooked by part of the battery 51, for example).

Figure 12:
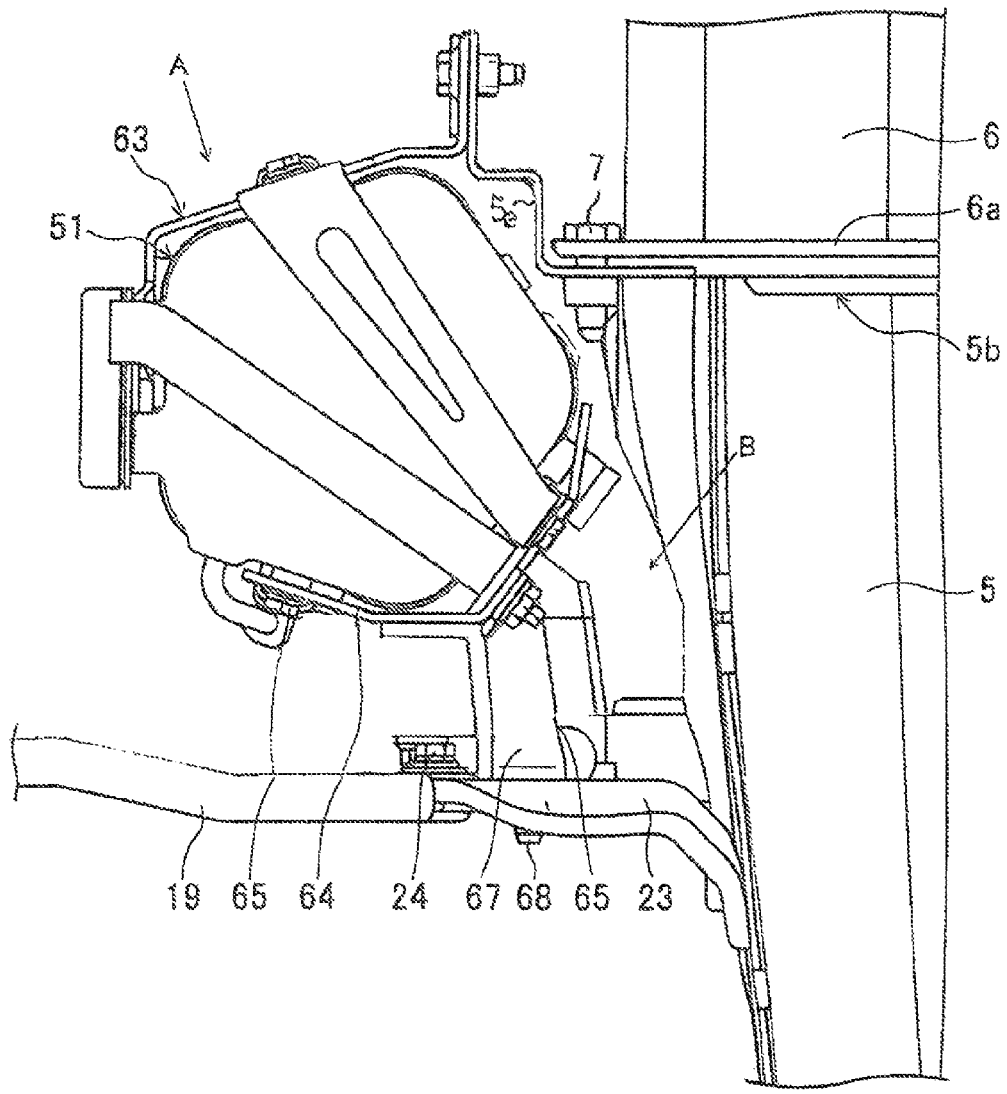
FIG. 12 is a plan view showing another embodiment of the battery arrangement structure according to the present invention is applied.

Further, in place of the above-described embodiment in which the battery 51 is arranged such that its front end portion is located in back of the rear end portion of the crush can 6, the battery 51 may be arranged such that its front end portion is located in front of the rear end portion of the crush can 6 and in back of the front end portion of the crush can 6 as shown in FIG. 12. In this case, in the vehicle light collision in which the crush can 6 is not crushed up to its rear portion, the impact absorption function by the crush of the crush can 6 can be achieved properly, and also the breakage of the battery 51 can be restrained. Moreover, in this case, a sufficient distance between the rear end portion of the battery 51 and the front wheel 3 can be ensured. Accordingly, it may not be necessary to arrange the battery 51 to be offset inwardly, in the vehicle width direction, from the wheel 3. Thereby, even in a case in which the battery 51 and the front wheel 3 are overlapped partially in the elevation view, the battery 51 can be surely prevented from interfering with the front wheel 3 in the vehicle frontal collision. Thereby, the front side frame 5 is allowed to crush sufficiently, so that the impact absorption function by the front side frame 5 can be achieved properly, and also the breakage of the battery 51 can be restrained surely.

Also, the battery 51 may be comprised of any other component device than the capacitor (Nickel metal hydride, Nickel-Cadmium rechargeable battery, Lithium-ion rechargeable battery, Lead-acid battery, for example). Herein, the capacitor may be preferable due to a properly-prompt input and output of the electricity for the battery 51.

Further, the vehicle 1 of the present embodiment is driven by the engine, but it may be driven by a motor provided inside a motor room at the front portion of the vehicle, or a hybrid vehicle with both the engine and the motor may be applied.

What is claimed is:

1. A battery arrangement structure of a vehicle, comprising:
    a pair of front side frames extending in a vehicle longitudinal direction at right-and-left sides of the vehicle;
    crush cans provided at respective front ends of the front side frames; and
    a battery to charge an electricity,
    wherein said battery is arranged at a specified position which is located on an outside of the front side frame in a vehicle width direction and in back of a front end portion of said crush can and is supported via a flange portion provided between the front side frame and the crush can; and
    wherein said flange portion extends below the front side frame, and said battery has a vertically-longer shape and is supported through an upper-side portion of said flange portion which is located above a level of a lower face of the front side frame and a lower-side portion of said flange portion which is located below the level of the lower face of the front side frame.

2. The battery arrangement structure of a vehicle of claim 1, wherein said battery is arranged such that a front end portion thereof is located in back of a rear end portion of said crush can.

3. The battery arrangement structure of a vehicle of claim 1, wherein said battery is arranged such that a front end portion thereof is located in front of a rear end portion of said crush can.

4. The battery arrangement structure of a vehicle of claim 1, wherein said battery is arranged such that a rear end portion thereof is located in front of a front wheel.

5. The battery arrangement structure of a vehicle of claim 1, wherein said specified position of said battery arranged is offset, in the vehicle width direction, from one of said front wheels which is positioned closer to the battery in an elevational view of the vehicle.

6. The battery arrangement structure of a vehicle of claim 1, wherein said battery is supported at one of said front side frames which is positioned closer to the battery.

7. The battery arrangement structure of a vehicle of claim 1, wherein said flange portion comprises a body portion and a support portion which extends forwardly from an outside end portion, in the vehicle width direction, of the body portion, and said battery is supported through said support portion of the flange portion.

8. The battery arrangement structure of a vehicle of claim 7, wherein said crush cans are configured to crush in the vehicle longitudinal direction in a vehicle frontal collision, said support portion of the flange portion is arranged at a specified position which is located in back of a front end of the crush can crushed in the vehicle longitudinal direction in the vehicle frontal collision, and said battery is arranged at a specified position which is located in back of a rear end of the crush can.

9. The battery arrangement structure of a vehicle of claim 1, wherein said flange portion comprises a temporary support portion to temporarily support said battery when the battery and the flange portion are fixed together.

10. A battery arrangement structure of a vehicle, comprising:
    a pair of front side frames extending in a vehicle longitudinal direction at right-and-left sides of the vehicle;
    crush cans provided at respective front ends of the front side frames; and
    a battery to charge an electricity,
    wherein said battery is arranged at a specified position which is located on an outside of the front side frame in a vehicle width direction and in back of a front end portion of said crush can; and
    wherein a support bracket to support a fender panel provided above the front wheel is fixed to the front side frame, and said battery is supported via said support bracket.

11. The battery arrangement structure of a vehicle of claim 10, wherein said front side frames are configured to bend at plural portions thereof and crush in the vehicle longitudinal direction in a vehicle frontal collision, and said support bracket is fixed to another portion of the front side frame than said plural portions bending in the vehicle frontal collision.

12. The battery arrangement structure of a vehicle of claim 10, wherein said support bracket is configured to maintain a fixing state thereof to the front side frame when the battery retreats in a vehicle frontal.

13. A battery arrangement structure of a vehicle, comprising:
   a pair of front side frames extending in a vehicle longitudinal direction at right-and-left sides of the vehicle;
   crush cans provided at respective front ends of the front side frames; and
   a battery to charge an electricity,
   wherein said battery is arranged at a specified position which is located on an outside of the front side frame in a vehicle width direction and in back of a front end portion of said crush can; and
   wherein said battery includes plural battery elements which are arranged in two layers at an upper level and a lower level, and is covered with a cover member.

14. A battery arrangement structure of a vehicle, comprising:
   a pair of front side frames extending in a vehicle longitudinal direction at right-and-left sides of the vehicle;
   crush cans provided at respective front ends of the front side frames;
   a suspension cross member supporting right-and-left front wheels at right-and-left end portions thereof; and
   a battery to charge an electricity,
   wherein said battery is arranged on an outside of the front side frame in a vehicle width direction and supported via a flange portion provided between the front side frame and the crush can, and
   said flange portion extends below the front side frame, and said battery has a vertically-longer shape and is supported through an upper-side portion of said flange portion which is located above a level of a lower face of the front side frame and a lower-side portion of said flange portion which is located below the level of the lower face of the front side frame.

15. A battery arrangement structure of a vehicle, comprising:
   a pair of front side frames extending in a vehicle longitudinal direction at right-and-left sides of the vehicle;
   crush cans provided at respective front ends of the front side frames;
   a suspension cross member supporting right-and-left front wheels at right-and-left end portions thereof; and
   a battery to charge an electricity,
   wherein said battery is arranged at a specified position which is located on an outside of the front side frame in a vehicle width direction and between the front wheel and the crush can in the vehicle longitudinal direction, a support bracket to support a fender panel provided above the front wheel is fixed to the front side frame, and said battery is supported via said support bracket.

* * * * *